United States Patent [19]
Platzer, Jr.

[11] 3,921,453
[45] Nov. 25, 1975

[54] THERMOCOUPLE SYSTEM HAVING A PN JUNCTION FOR COLD JUNCTION COMPENSATION

[75] Inventor: George E. Platzer, Jr., Southfield, Mich.

[73] Assignee: Chrysler Corporation, Highland Park, Mich.

[22] Filed: Mar. 8, 1974

[21] Appl. No.: 449,313

[52] U.S. Cl. .................. 73/361; 73/346; 307/117; 307/310; 340/57; 340/228 R
[51] Int. Cl.² ..................... G01K 7/12; G01K 1/14
[58] Field of Search ............ 73/341, 359, 361, 346; 307/117, 310; 323/75 H; 328/3; 340/228 R, 57

[56] References Cited
UNITED STATES PATENTS

| | | | |
|---|---|---|---|
| 3,100,397 | 8/1963 | Peltola | 73/359 |
| 3,461,380 | 8/1969 | McGhee | 73/361 X |
| 3,678,486 | 7/1972 | Bickel et al. | 73/341 X |
| 3,688,295 | 8/1972 | Tsoras et al. | 340/228 X |
| 3,821,562 | 6/1974 | Davis et al. | 307/117 |
| 3,838,569 | 10/1974 | Reck | 73/346 X |
| 3,860,875 | 1/1975 | Darnell et al. | 328/3 |

Primary Examiner—Richard C. Queisser
Assistant Examiner—Frederick Shoon
Attorney, Agent, or Firm—Talburtt & Baldwin

[57] ABSTRACT

A thermocouple system for catalytic controllers uses a PN junction at the cold junction for cold junction compensation. The linearity of the voltage drop across the PN junction permits accurate scaling for direct reading of the temperature at the output of the system. A switching circuit is described wherein the desired switching temperature is electrically entered into the circuit and when the compensated temperature signal is equal to the entered signal, the output of the switching circuit is switched.

8 Claims, 6 Drawing Figures

THERMOCOUPLE SYSTEM HAVING A PN JUNCTION FOR COLD JUNCTION COMPENSATION

BACKGROUND OF THE INVENTION

1. Field of Invention

This invention relates in general to thermocouple circuits for temperature sensing and more particularly, for circuits providing cold junction compensation by means of a PN junction.

2. Prior Art

As is well known in the art, thermocouples are a junction of two dissimilar metals capable of generating a potential depending upon the composition, structure, and temperature of the metals. Some pairs of metals exhibit a linear variation of junction potential with temperature over a considerable temperature range. For example, chromel and alumel when joined show a change in potential of about 22 microvolts per degree Fahrenheit in the range from −100°F. to 1800°F.

Unfortunately, this junction voltage cannot be directly measured. If copper wires are joined to a chromel wire and an alumel wire which have themselves been joined to form a chromel-alumel junction, there is no measurable potential when all of the junctions (chromel-alumel, chromel-copper, alumel- copper) are at the same temperature. However, if the two copper containing junctions are held at the same temperature and the temperature of chromel-alumel junction is varied, the potential of the chromel-alumel junction increases at the previously mentioned rate of 22 microvolts/°F.

As an example of a characteristic of thermocouple measurements, assume that the chromel-alumel junction is at 1000°F. and that the cold junctions are at 0°F. There is a potential difference of 22 millivolts developed across the ends of the copper wires. If the temperature of the cold junctions is raised to 100°F., the output voltage across the ends of the copper wires will drop to 19.8 millivolts. The characteristic illustrated is that the chromel-copper junction and the alumel-copper junction act as a single chromel-alumel junction when they are both at the same temperature.

The user of thermocouples is always faced with the probelm presented by the temperature difference between the hot junction and the cold junctions. In the previous example, the user knew the hot junction was at 1000°F. (22mV) as long as the cold junctions were held at 0°F.; however, when the cold junction came up to 100°F., the hot junction temperature could still be determined from the output voltage by adding the decrease in output voltage due to the temperature of the cold junctions (2.2 mV) to the output voltage of the thermocouple (19.8 mV). This is cold junction compensation. Whether cold junction compensation is performed manually or automatically, it involves measuring the temperature of the cold junctions and then applying a correction to the total output voltage of the thermocouple.

SUMMARY OF INVENTION

The advent of highly reliable and inexpensive integrated circuit operational amplifiers makes it practical to use these devices as amplifiers for monitoring thermocouples. Previously, temperature indicators or controllers using thermocouples required expensive circuitry and could only be used where the cost could be justified. With integrated circuits, it is possible to greatly reduce cost and, hence, extend the use of thermocouples to applications where they have not previously been considered.

It is a principal object of this invention to use semiconductor circuitry, especially the integrated circuit operational amplifier, to sense temperature by means of thermocouples.

It is another object ot use a semiconductor PN junction for cold junction compensation.

These and other objects are found in the solid state thermocouple system wherein cold junction compensation is accomplished by means of a semiconductor PN junction positioned at the cold junction. Both the signals generated from the thermocouple and from the PN junction are respectively amplified and summed and compared in a comparator with a reference signal. The output of the comparator will switch or operate a utilization means such as an indicator, meter or some other indicating means.

DETAILED DESCRIPTION

Figure 1:
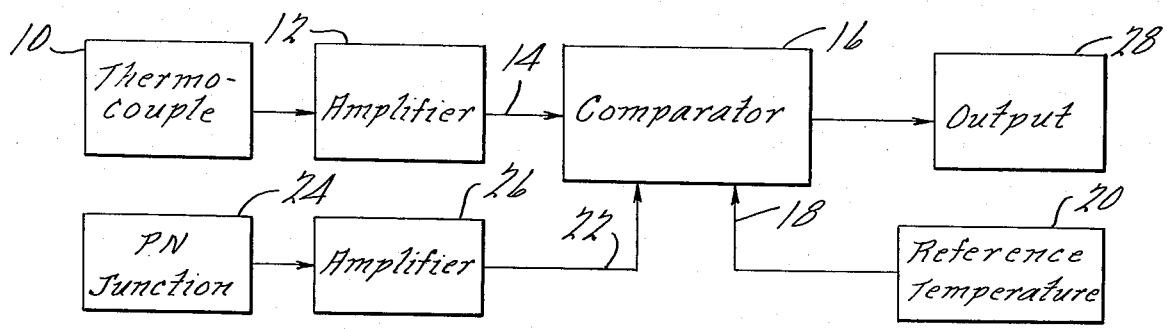
FIG. 1 is a block diagram of the system of the present invention.

Referring to the FIGS. by the characters of reference, there is illustrated in FIG. 1, a block diagram of a solid state thermocouple actuated switching circuit. For the purpose of this specification, a thermocouple 10 is defined as comprising the hot junction formed by two dissimilar metals in the form of wires and the wires from the hot junction with no intermediate junction. The output of the thermocouple 10 is electrically connected to an amplifier 12. The output signal from the amplifier 12 is electrically connected to one input 14 of a comparator 16. A second input 18 to the comparator 16 is from a reference temperature circuit 20 generating a signal representing the hot junction temperature at which the comparator 16 will produce an output signal. A third input 22 to the comparator 16 is a signal representing cold junction compensation. This signal is generated by a compensator means comprising a PN junction 24 or diode which is physically located so as to be at the same temperature as the cold junction and is amplified by a second amplifier 26 whose output is connected to the third input 22 of the comparator 16. The voltage developed across the PN junction 24, or diode, varies linearly with temperature when a constant current flows through the junction.

The output signal from the comparator 16 is electrically connected to an output stage 28 which may be a simple power amplifier to drive a solenoid; an astable multivibrator to drive a warning lamp; to name but a couple of useful output stages.

Figure 2:
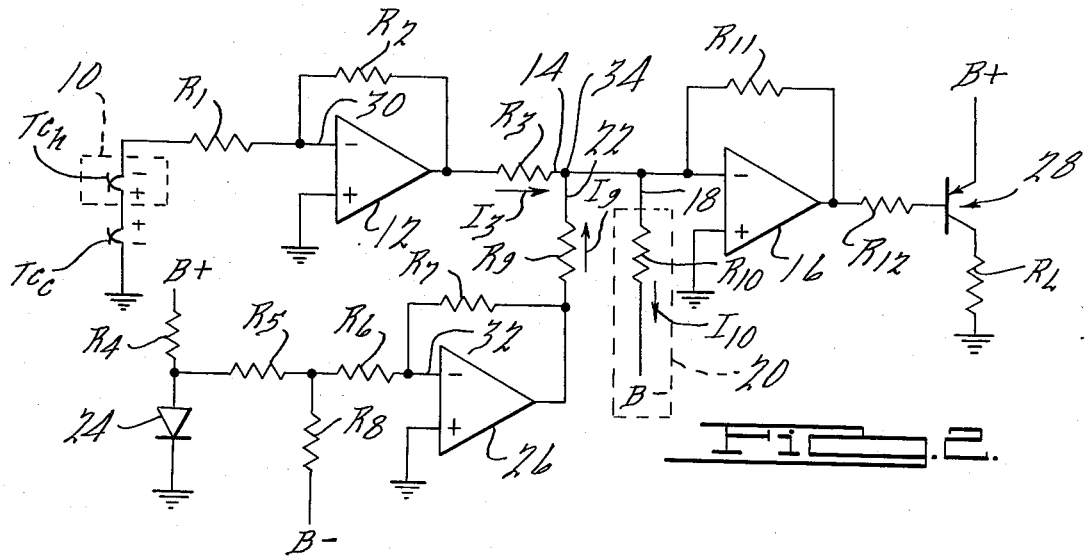
FIG. 2 is a schematic of the system of FIG. 1 used as an electronic switch.

FIG. 2 is a schematic of the system of FIG. 1 wherein the thermocouple junction, $TC_h$, of the thermocouple 10 is located remotely in a hot region. This junction is electrically poled with respect to the operational amplifier 12 so that the negative terminal of the junction is electrically connected to the inverting input 30. A second thermocouple junction, $TC_c$, representing the cold junctions, is located in the electronic assembly, an is shown as a single junction, since it effectively acts as a single junction having the same temperature variation as the hot junction. The thermal voltages generated by the hot and cold junctions oppose or buck each other and the difference in potential is used to generate an input current to the operational amplifier 12. The input current will be of magnitude $(e_h - e_c)/R_1$ where $e_h$ is the voltage generated by $TC_h$ $e_c$ is the voltage generated by $TC_c$.

Since the input resistance of the operational amplifier is very high, no appreciable current will flow into the input terminal 30. Therefore, the generated current flows through the feedback resistor, $R_2$ and output voltage of the operational amplifier 12 is:

$$(e_h - e_c)R_2/R_1$$

The output voltage of the operational amplifier 12 produces a current, $I_3$, having a magnitude of:

$$I_3 = \frac{(e_h - e_c)R_2}{R_1 R_3} \qquad \text{Eq. 1}$$

This current $I_3$ is directly proportional to the difference in potential of the junctions and can be related to temperature if a constant rate of change of voltage with temperature is assumed. That is $$\frac{de_h}{dT} = \frac{de_c}{dT} = \alpha \qquad \text{Eq. 2}$$

Then, $$I_3 = \frac{[\alpha(T_h - T_o) - \alpha(T_c - T_o)]R_2}{R_1 R_3} \qquad \text{Eq. 3}$$

Since previously stated the actual junction voltage cannot be measured, the potential difference between the hot and cold junctions $TC_h$ and $TC_c$ is measured relative to some reference temperature, $T_o$.

To have a current proportional to the temperature of the hot junction by itself, it will be necessary to add to $I_3$ a current $$I_0 = \frac{\alpha(T_c - T_o)R_2}{R_1 R_3} \qquad \text{Eq. 4}$$

This current is generated by the PN junction 24 or diode, a second operational amplifier 26, and their associated resistors. As previously stated, the solid state PN junction 24 or diode which is the compensator means, exhibits a relatively constant rate of change of voltage with temperature when the diode current is held constant. This rate is denoted by $\delta$ (delta), and has a typical value of about $-1.2$mV/°F. for a silicon diode.

In the compensation circuit, the three resistors $R_4$, $R_5$, and $R_8$, form a voltage divider having a substantially constant current flowing therethrough. This current varies due to the change in voltage across the PN junction 24 because of temperature. The voltage across the PN junction 24 is on the order of 0.7V at $-50$°F. and 0.4V at 200°F.

The input resistor $R_6$ to the inverting input 32 of the second operational amplifier 26 has the end at the amplifier essentially at ground potential, therefore, the voltage across this input resistor $R_6$ is found to be, $$e_{R_6} = \frac{V_D R_6 R_8 - E R_5 R_6}{(R_5 + R_8)(R_6 + R_8) - R_8^2} \qquad \text{Eq. 5}$$

Differentiating with respect to temperature, $$\frac{de_{R_6}}{dT} = \frac{\delta R_6 R_8}{(R_5 + R_8)(R_6 + R_8) - R_8^2}$$

$$= \delta \frac{1}{1 + R_5 \left(\frac{1}{R_6} + \frac{1}{R_8}\right)} = \delta' \qquad \text{Eq. 6}$$

Therefore, as long as the input resistor $R_6$ and the biasing resistor $R_8$ are large compared to the series resistor $R_5$, almost the full $\delta$ will appear across the input resistor $R_6$. The series resistor $R_5$ develops a voltage across it to buck the voltage of the PN junction 24. The second operational amplifier 26 is, therefore, responsive to the difference in the voltage across the PN junction 24 and the series resistor $R_5$. In operation, this potential difference is adjusted to zero at the reference temperature by adjusting the biasing resistor $R_8$ in order that a voltage will only appear across the input resistor $R_6$ when the temperature of the PN junction 24 changes. This voltage across the input resistor $R_6$ is amplified by the ratio of the feedback resistor $R_7$ and the input resistor $R_6$, $R_7/R_6$ so that the output voltage of the second operational amplifier 26 is $$e_{R_7} = \delta'(T_D - T_o) \frac{R_7}{R_6}. \qquad \text{Eq. 7}$$

With the PN junction 24 and the cold junctions $TC_c$ at the same temperature, $$e_{R_7} = \delta'(T_c - T_o) \frac{R_7}{R_6}. \qquad \text{Eq. 8}$$

Since the current $I_9$ from the second operational amplifier 26 should be equal to $I_3$ at the reference temperature $T_o$, $I_9$ is $$I_9 = \frac{e_{R_7}}{R_9} = \frac{\delta'(T_c - T_o)R_7}{R_6 R_9}. \qquad \text{Eq. 9}$$

Setting the two output resistors $R_3$ and $R_9$ from the first and second operational amplifiers equal, $R_3 = R_9$, equate $I_3$ and $I_9$, $$\frac{\alpha(T_c - T_o)R_2}{R_1 R_3} = \frac{\delta'(T_c - T_o)R_7}{R_6 R_3}. \qquad \text{Eq. 10}$$

It is seen that the relationship among the feedback and input resistors for each operational amplifier 12 and 26 is $$\frac{R_7}{R_6} = \frac{\alpha}{\delta'} \times \frac{R_2}{R_1}. \qquad \text{Eq. 11}$$

The above equation defines the gain required of the second operational amplifier 26.

The comparator or third operational amplifier 16 functions as a summing amplifier. At the summing junction 34, the currents $I_3$ and $I_9$ are added. A third current, $I_{10}$, representing the switching temperature is equal to the current produced by the thermocouple 10 junction at that temperature, and is subtracted from the summing junction 34. This current $I_{10}$ is defined as:

$$I_{10} = \frac{\alpha(T_h - T_a)R_2}{R_1 R_3} = \frac{E_{B-}}{R_{10}} \qquad \text{Eq. 12}$$

where $E_{B-}$ = negative supply voltage.

The reference current resistor $R_{10}$ is electrically connected to a negative source, $E_{B-}$ as illustrated. When the sum of the output currents of the first and second operational amplifiers 12 and 26, $I_3$ and $I_9$, respectively, exceed the third current $I_{10}$, a current flows through the feedback resistor $R_{11}$ of the third operational amplifier 16 in a direction to produce a negative output signal therefrom. This signal provides base current through the base resistor $R_{12}$ of an output transistor 28 for driving it into conduction to operate a load $R_L$.

In one embodiment, the feedback resistor $R_{11}$ may be an open circuit, and the full open loop gain of the third operational amplifier 16 can be used. If the third operational amplifier 16 has a gain of 100, then with a chromel-alumel thermocouple 10, an output of 2.2 mV/°F. is developed across the output resistor $R_3$ from the first operational amplifier 12. If the third operational amplifier 16 has an open loop gain of 3000, then a voltage equal to +E/3000 is the required change in input voltage to the first operational amplifier 12 required to drive its output from +E to 0. As an example with ±6V supply, this is a voltage change of 2mV. therefore, within less than 1°F. of temperature change, the third operational amplifier 16 will be switched at the reference temperature.

Figure 3:
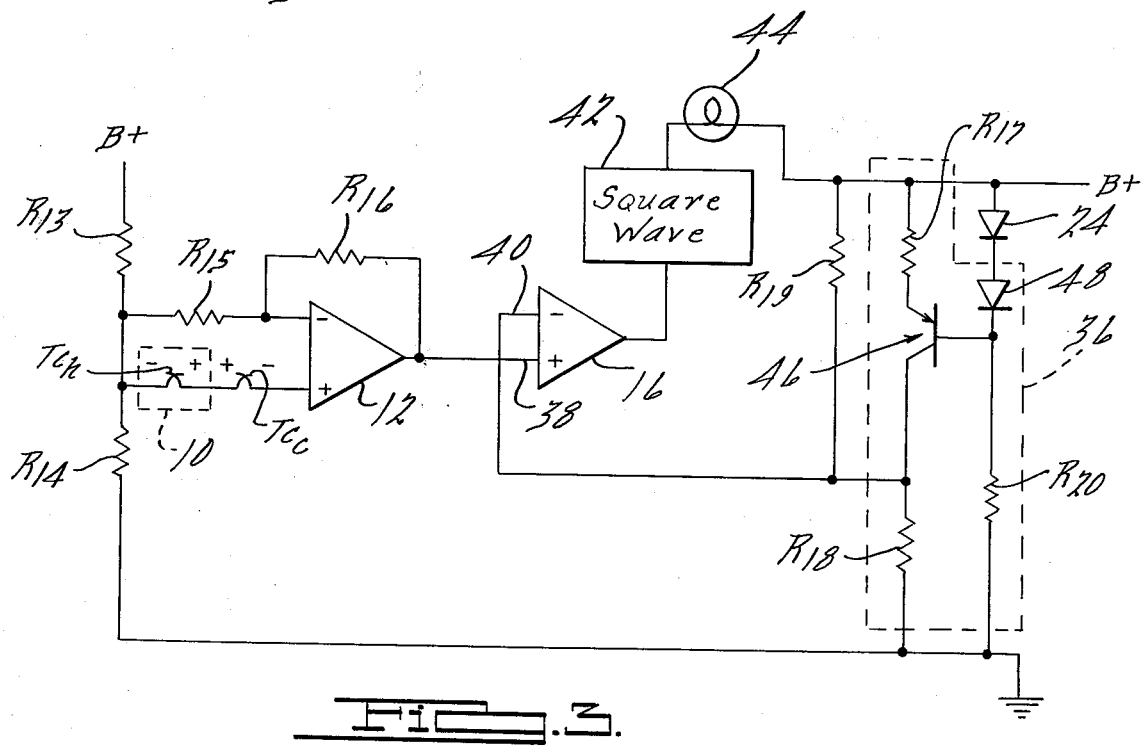
FIG. 3 is a schematic of the system of FIG. 1 used as an indicator system.

FIG. 3 illustrates a modification in applying the cold junction compensation. In the circuit of FIG. 2, three currents were compared with the third or reference current held constant. In the modification cirucit of FIG. 3, two voltages; the amplified voltage of the thermocouple 10, and a reference voltage are compared. The reference voltage is changed by the PN junction 24 in a constant current circuit 36 to provide cold junction compensation.

The circuit of FIG. 3 uses a single supply voltage, and the operational amplifiers 12 and 16 are referenced to a voltage generated by a voltage divider comprising series resistors of $R_{12}$ and $R_{14}$. The output voltage of the first operational amplifier 12 is given by:

$$e_o = [\alpha(T_h - T_a) - \alpha(T_c - T_a)] \frac{R_{16}}{R_{15}} \qquad \text{Eq. 13}$$

This voltage signal is electrically connected to the non-inverting input 38 of the comparator or third operational amplifier 16 operating as a voltage comparator. When the voltage at the non-inverting input 38 becomes more positive than the voltage at the inverting input 40 the output voltage of the comparator 16 switches from near ground to near the supply voltage for activating a square wave generator 42 driving an indicator 44 to indicate an over-temperature condition.

The reference voltage, to which the output voltage of the first operational amplifier 12 is compared, appears across the collector resistor $R_{18}$ of the constant current 36 circuit. A relatively constant current flowing through the collector resistor $R_{18}$ is provided by the biasing resistor $R_{19}$. A variable current, which varies with the cold junction temperature, is provided to the collector resistor $R_{18}$, by the emitter resistor $R_{17}$, and the base circuit of the transistor 46. The base circuit comprises the PN junction 24 and a diode 48 electrically connected from the supply to the base lead and a series resistor $R_{20}$ electrically connected from the base lead to ground.

As the cold junction temperature increases, the output of the first operational amplifier 12 decrease. Hence, the collector resistor $R_{18}$ must drop a corresponding amount to maintain switching of the comparator 16 at the same hot junction temperature. therefore, the current supplied from the transistor 46 through the collector resistor $R_{18}$ must be reduced as the cold junction temperature rises.

The transistor 46 and the emitter resistor $R_{17}$ comprise an emitter follower which is biased by the voltage across the PN junction 24 and series diode 48 in the base circuit. These two diodes 24 and 48 are biased into conduction by the series resistor $R_{20}$. The function of this circuit is to control the current through the emitter resistor $R_{17}$ proportional to the voltage across the PN junction 24. The series diode 48 is used to compensate for the emitter base voltage required by the transistor 46, and may be viewed as a source of bias for the transistor 46. If the diode 48 is a diode-connected transistor of the same type as the transistor 46 it will match the base-emitter voltage drop of the transistor over the current and temperature range required.

With the series diode 48 providing the matching voltage for the emitter-base diode of the transistor 46, the emitter resistor $R_{17}$ is required to have flowing in it precisely that amount of current which will match the voltage drop across the PN junction 24. If the voltage of the PN junction 24 varies with temperature, then the current through the emitter and collector resistors $R_{17}$ and $R_{18}$ will also vary. Thus, the transistor 46 becomes a current source generating a current proportional to the temperature of the PN junction 24.

To properly size the resistors $R_{17}$, $R_{18}$ and $R_{19}$ in the circuit of FIG. 3 for yielding the correct cold junction compensation, the following facts must be considered. The voltage across the collector resistor $R_{18}$ which is due to the current from the biasing resistor 19, provides the additional current necessary to produce the reference voltage. Also, there will be an interaction between the currents supplied from the biasing resistor $R_{19}$ and the transistor 46. the current from the biasing resistor $R_{19}$ is changed when the current from the transistor 46 is changed. This interaction may be avoided by using an ideal current generator in place of the biasing resistor $R_{19}$, but it is not required for satisfactory operation.

The potential across the collector resistor $R_{18}$ is given by;

$$e_{R_{18}} = E \frac{R_{18}}{R_{18} + R_{19}} + I_5 \; R_{18} \frac{R_{19}}{R_{18} + R_{19}}. \qquad \text{Eq. 14}$$

where $$I_5 = V_D/R_{17}. \qquad \text{Eq. 15}$$

Therefore:

$$e_{R_{18}} = E \frac{R_{18}}{R_{18} + R_{19}} + V_D \frac{R_{18}}{R_{17}} \left( \frac{R_{19}}{R_{18} + R_{19}} \right) \qquad \text{Eq. 16}$$

To determine the variation of $e_{R18}$ with the temperature of the PN junction 24 and the cold junction, the above equation is differentiated with respect to temperature yielding, $$\frac{de_{R18}}{dT} = \delta \frac{R_{1K}}{R_{17}} \frac{R_{19}}{R_{1K} + R_{19}} \qquad \text{Eq. 17}$$

The equation is interpreted as indicating that the change in $e_{R18}$ with temperature is equal to the change in the voltage across the PN junction 24 multiplied by a ratio wherein the numerator is the collector resistor $R_{18}$ and the biasing resistor $R_{19}$ is in parallel and the denominator is the emitter resistor $R_{17}$.

The signal change in the output voltage of the first operational amplifier 12 due to the change in the cold junction temperature is defined as follows:

$$\frac{de}{dT} = \alpha \frac{R_{16}}{R_{15}} \qquad \text{Eq. 18}$$

then for proper tracking:

$$\delta \frac{R_{1K}}{R_{17}} \frac{R_{19}}{R_{1K} + R_{19}} \quad \alpha \frac{R_{16}}{R_{15}} \qquad \text{Eq. 19}$$

By adjusting the biasing resistor $R_{19}$ to vary the reference voltage, or be leaving the biasing resistor fixed and varying the output of the voltage divider, the switching point of the second operational amplifier 16 is set. In the preferred embodiment, the voltage divider $R_{13}$ and $R_{14}$ is varied to avoid the interaction due to the biasing resistor with $de_{R18}/dT$. As an example, assume switching is desired to be at 1500°F.; therefore, the output voltage of the thermocouple 10 junction relative to some reference temperature is:

$$e_h = \alpha(T_h - T_u) \qquad \text{Eq. 20}$$

with a chromel-alumel thermocouple and a reference temperature of 0°F., $e_h$ is equal to $22 \times 10^{-6} \times 1500$ or 33mV. If the gain of the first operational amplifier 12 is 100, then the output voltage of that amplifier due to the hot thermocouple is 3.3V. With the voltage divider voltage equal to about 2V, the output voltage of the first operational amplifier 12 is 5.3V. The voltage at the collector resistor $R_{18}$ is also at about 5.3V. and the three resistors, the collector, emitter and biasing resistors, are sized to maintain this voltage of 5.3V, at these temperature conditions while satisfying the equation above for proper tracking This equation must be precisely satisfied even through the exact voltage at the emitter resistor $R_{17}$ is not important. Either of the voltage divider resistors $R_{13}$ and $R_{14}$ may now be varied to accurately set the switching point of the second operational amplifier 16. The circuit of FIG. 3 according to the above equation will yield a cold junction compensation accuracy of ±7°F. over a cold junction temperature range from 0°F. to 200°F.

Figure 4:
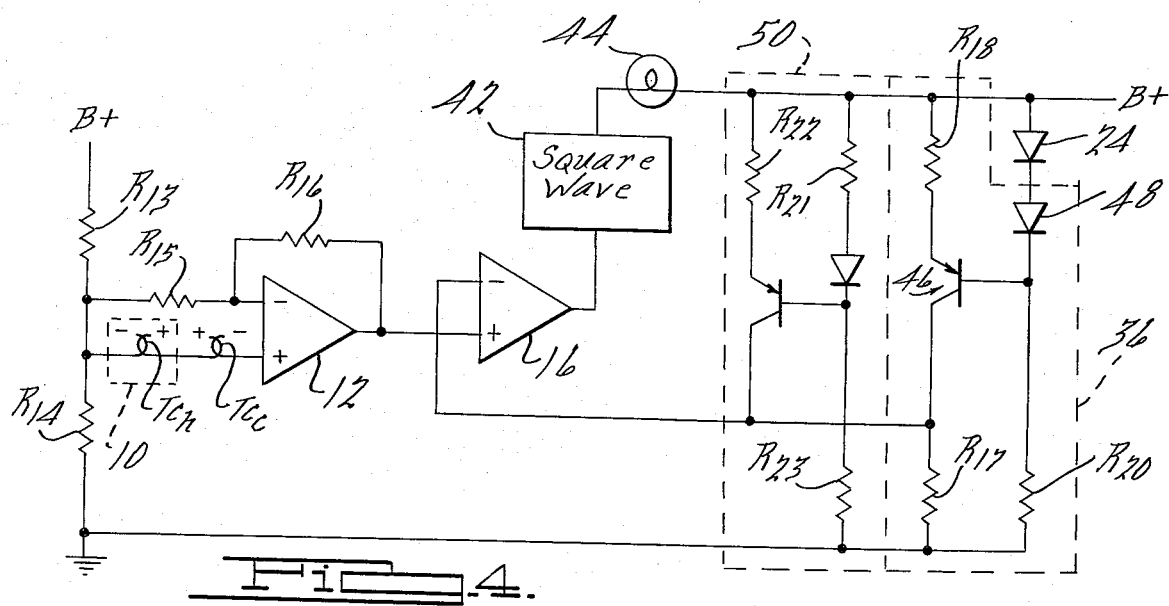
FIG. 4 is a modification of the circuit of FIG. 3.

FIG. 4 illustrates a modification of FIG. 3 in that a second constant current source 50 is shown in place of the biasing resistor $R_{19}$. In this case, the tracking equation above is reduced to:

$$\delta \frac{R_{1K}}{R_{17}} = \alpha \frac{R_{16}}{R_{15}} \qquad \text{Eq. 21}$$

and the resistor sizing is simplified. The final adjusting of FIG. 4 is accomplished by adjusting either of the resistors $R_{21}$ or $R_{22}$ in the second constant current source 50.

Figure 5:
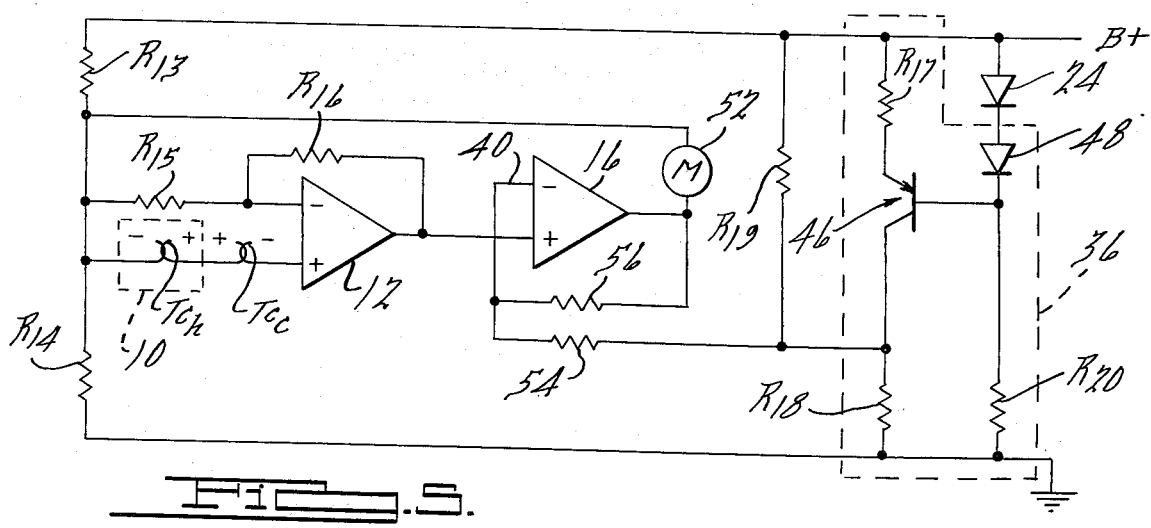
FIG. 5 is a modification of the circuit of FIG. 3 for use as a meter reading circuit.

FIGS. 1-4 have illustrated systems for switching an output at a present temperature. However, as shown in FIG. 5, the same concepts may be applied to supplying a current or voltage to a meter 52 to give a continuous indication of the temperature of the thermocouple 10 junction. FIG. 2 may be modified by having the second operational amplifier 16 operate as an amplifier for driving a voltmeter 52. The feedback resistor 54 for the second operational amplifier 16 is adjusted for the characteristics of the meter 52.

In a similar manner, the system of FIG. 3 may be modified as illustrated in FIG. 5, wherein the second operational amplifier 16 is again used as an amplifier for driving a meter 52 and responding to the voltage difference between the voltage divider $R_{13}$ and $R_{14}$ and the collector resistor $R_{18}$. The collector of the transistor 48 is electrically connected through an input resistor 54 to the inverting input 40 of the second operational amplifier 16. Cooperating with a feedback resistor 56, the input resistor 54 is used to scale the output of the second operational amplifier 16 to the requirements of the meter 52.

Figure 6:
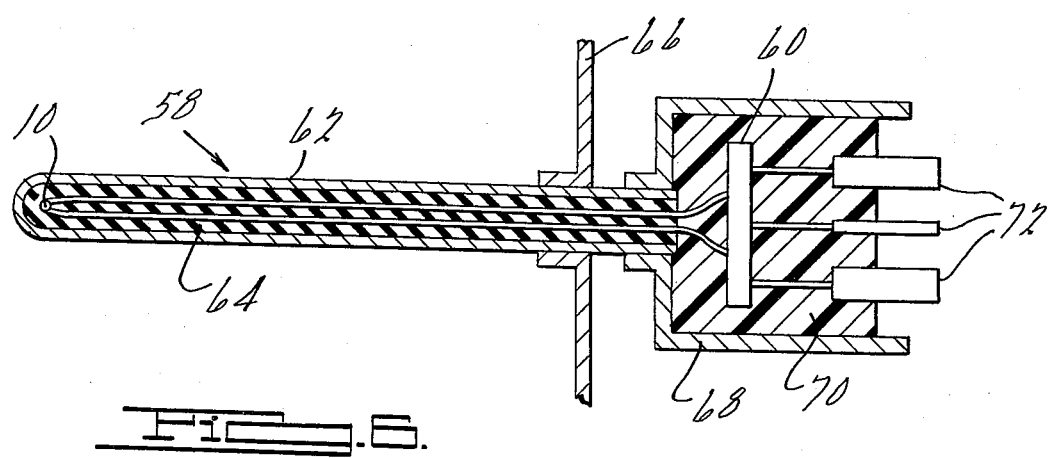
FIG. 6 is a sectional view of a thermocouple probe utilizing the system of the present invention.

Referring to FIG. 6 there is illustrated a thermocouple probe 58 having the electronic amplifier system 60 integral with the probe 58. For example, in an automotive catalyst temperature controller, the probe comprising a sheath 62 which is a tubular housing enclosed at one end may be 7 inches long with 3 inches of it in the catalyst container. The thermocouple 10 is positioned at the closed end of the sheath 62 and is maintained in a spaced relationship by means of electrical insulation 64. By use of an infrared radiation shield 66, the outboard end of the sheath 62 is cool enough to allow a housing member 68 mounted to the open end of the sheath 62 for supporting and maintaining the electronic amplifier system 60. The active electronic components in the amplifier system 60 would preferably be passivated with a silicon nitride coating, and the complete assembly 60 is sealed in the housing 68 by means of a potting compound 70. The space required for the electronic amplifier system 60 as previously illustrated is less than one-half cubic inch. A three terminal connector or terminals 72 are provided extending out of the sealed electrically groundable housing for attaching wires to the output stage of the electronic amplifier system 60.

The sectional view of the integral probe 58 and electronic amplifier system 60 as illustrated in FIG. 6 is useful in the single-sided supply system of an automobile. To insulate the probe 58 from the ground, the thermocouple wire 10 is shown insulated from the stainless steel sheath 62. Although this reduces the time response of the thermocouple 10, the reduction is acceptable for most applications. However, an alternate structure which would not affect the time response would be to spot weld the thermocouple hot junction to the inside of the tip of the sheath and then insulate the sheath from the housing to which it is mounted.

There has thus been shown and described a thermocouple system including a mounting means wherein solid state components are used to provide cold junction compensation. Several different systems have been described which illustrate various circuit configurations for utilizing cold junction compensation for switching circuits, meter circuits or indicator circuits.

What is claimed is:

1. A solid state thermocouple actuated electronic switch circuit with solid state cold junction compensation, said circuit comprising:
    a thermocouple having a junction of two dissimilar metals with each metal being a current conducting member;
    a first amplifier having its input terminals electrically connected respectively to said current conducting members of said thermocouple forming a cold junction and responsive to the voltage signal generated by said thermocouple for generating a first amplifier signal;
    a solid state, semiconductor cold junction compensator means generating a voltage responding to the temperature of said cold junction;
    a second amplifier having its input electrically connected to said solid state cold junction compensator means and responsive to said voltage signal generated thereby for generating a second amplified signal;
    a reference temperature signal generator means generating a third signal representing the actuating temperature of the switch circuit;
    a summing-comparator responsive to the summation of said first, second and third signals for generating a fourth signal whenever the magnitude summation of said first and second signal exceeds the magnitude of said third signal; and
    a solid state switching means responsive to said fourth signal for changing its state of conduction.

2. A solid state thermocouple actuated electronic switch circuit according to claim 1 wherein said cold junction compensator means is a PN junction having linear voltage-temperature characteristic.

3. A solid state thermocouple actuated electronic switch circuit according to claim 2 wherein said PN junction is a silicon diode.

4. A solid state thermocouple actuated electronic switch according to claim 2 wherein said solid state switching means is a square wave generator and electrically connected thereto is an indicator means for indicating when the temperature of said thermocouple exceeds the reference temperature.

5. A solid state thermocouple actuated electronic switch circuit according to claim 4 wherein said indicator means is a meter for indicating the temperature of said thermocouple.

6. A solid state temperature measuring probe comprising
    a tubular housing enclosed at one end,
    a thermocouple having a junction at one end of two dissimilar metals with each metal being a current conducting member, said junction positioned in a spaced relationship to said enclosed end of said housing and the other end of said current conducting members extending beyond said open end of said housing,
    insulation means supporting said thermocouple and maintaining said thermocouple in a spaced relationship to the interior walls of said housing,
    solid state circuit means having its input electrically connected to the other end of each of said current conducting members of said thermocouple said circuit means having a solid state semiconductor cold junction compensator means and a summing amplifier means for generating an output signal in response to the signals generated by said thermocouple and said solid state cold junction compensation means; and
    a housing member integrally connected to the open end of said housing for supporting and maintaining said circuit means in close proximity with the said other end of each of said current conducting members for the shortest and most direct connection of said current conducting members to said solid state circuit means.

7. A solid state temperature measuring probe in accordance with claim 6 above and further including a radiation shield positioned between the dissimilar junction end of the thermocouple and the housing member.

8. A solid state temperature measuring probe comprising:
    a tubular housing enclosed at one end,
    a thermocouple having a junction at one end of two dissimilar metals with each metal being a current conducting member, said junction positioned in a spaced relationship to said enclosed end of said housing and the other end of said current conducting members extending beyond said open end of said housing,
    insulation means supporting said thermocouple and maintaining said thermocouple in a spaced relationship to the interior walls of said housing,
    solid state circuit means having its input electrically connected to the other end of each of said current conducting members of said thermocouple, said circuit means having a first solid state signal amplifier means for amplifying a first signal generated by the thermocouple in response to the temperature at the dissimilar junction end of the thermocouple, a solid state, semiconductor cold junction compensator means generating a second signal responsive to the temperature at the said other end of said current conducting members of said thermocouple, a second solid state signal amplifier means for amplifying said second signal, and a summing amplifier means for generating an output signal in response to the first and second signals generated by said thermocouple and said solid state cold junction compensation means; and
    a housing member integrally connected to the open end of said housing for supporting and maintaining said circuit means.

* * * * *